(12) United States Patent
Cairo

(10) Patent No.: US 7,740,450 B2
(45) Date of Patent: Jun. 22, 2010

(54) LIGHTWEIGHT HUB FOR ROTORS

(75) Inventor: Ronald Ralph Cairo, Greer, SC (US)

(73) Assignee: General Electric Company, Schenectady, NY (US)

( * ) Notice: Subject to any disclaimer, the term of this patent is extended or adjusted under 35 U.S.C. 154(b) by 1244 days.

(21) Appl. No.: 11/286,937

(22) Filed: Nov. 23, 2005

(65) Prior Publication Data

US 2007/0114798 A1    May 24, 2007

(51) Int. Cl.
*F03B 3/12* (2006.01)

(52) U.S. Cl. ............................... 416/204 R; 416/244 A; 416/245 R

(58) Field of Classification Search ................... 416/94, 416/204 A, 204 R, 219 R, 244 A, 244 R, 416/245 R; 290/44, 55
See application file for complete search history.

(56) References Cited

U.S. PATENT DOCUMENTS

| | | | | |
|---|---|---|---|---|
| 1,750,141 A * | 3/1930 | Upson | ........................ | 244/96 |
| 1,755,422 A * | 4/1930 | Bucklen | ...................... | 416/13 |
| 1,763,835 A * | 6/1930 | Upson | ........................ | 244/30 |
| 1,964,008 A * | 6/1934 | Roberts | ...................... | 473/609 |
| 2,131,756 A * | 10/1938 | Roberts | ...................... | 473/605 |
| 2,210,954 A * | 8/1940 | Roberts | ...................... | 156/161 |
| 2,218,919 A * | 10/1940 | Madsen | ...................... | 473/604 |
| 2,389,791 A * | 11/1945 | Lippincott | ................... | 138/30 |
| 2,389,792 A * | 11/1945 | Lippincott | ................... | 138/30 |
| 3,245,476 A * | 4/1966 | Rodwick | ............... | 416/241 R |
| 4,366,386 A * | 12/1982 | Hanson | ....................... | 290/44 |
| 4,417,853 A * | 11/1983 | Cook | ....................... | 416/132 B |
| 4,437,856 A * | 3/1984 | Valli | .......................... | 604/29 |
| 4,565,929 A | 1/1986 | Baskin et al. | | |
| 4,735,552 A | 4/1988 | Watson | | |
| 4,792,281 A | 12/1988 | Coleman | | |
| 5,151,145 A * | 9/1992 | Cederberg | .................. | 156/172 |
| 5,186,458 A * | 2/1993 | Redondo | .................... | 473/570 |
| 5,354,175 A | 10/1994 | Coleman et al. | | |
| 5,474,425 A | 12/1995 | Lawlor | | |
| 6,190,134 B1 * | 2/2001 | Hudson | .................. | 416/244 R |
| 6,514,043 B1 | 2/2003 | Rasmussen et al. | | |
| 6,524,849 B1 * | 2/2003 | Adams et al. | ............ | 435/299.1 |
| 6,824,096 B2 * | 11/2004 | Zoppitelli et al. | ........ | 244/17.25 |
| 6,949,842 B2 | 9/2005 | Earley | | |
| 7,040,859 B2 * | 5/2006 | Kane | .......................... | 415/4.2 |
| 7,156,586 B2 | 1/2007 | Nim | | |
| 7,176,584 B1 * | 2/2007 | Green | ........................ | 290/55 |
| 2003/0040108 A1 * | 2/2003 | Adams et al. | ............ | 435/299.1 |
| 2006/0104820 A1 * | 5/2006 | Delucis | ................. | 416/244 R |

* cited by examiner

*Primary Examiner*—Edward Look
*Assistant Examiner*—Aaron R Eastman
(74) *Attorney, Agent, or Firm*—James McGinness, Esq.; Armstrong Teasdale LLP

(57) ABSTRACT

A structure for a hub of a rotor includes a space frame having truss members configured to carry primary torsion, bending, and direct loading. The structure also includes a shell on the space frame configured to stabilize the space frame and carry shear loading.

18 Claims, 3 Drawing Sheets

LIGHTWEIGHT HUB FOR ROTORS

BACKGROUND OF THE INVENTION

This invention relates generally to a lightweight hub structure, and more particularly to a hub structure including a space frame with truss members that is particularly suitable for use in wind turbine generators.

Monolithic shell structures with large cutouts are structurally inefficient and wasteful of material to produce. Moreover, large cutouts in monolithic shells result in stress concentrations, which further exacerbate structural inefficiency.

At least one known hub for a wind turbine includes a casting having a weight of approximately 68,000 pounds. This hub requires extensive machining to match multiple component interfaces. One known hub configuration typically has five large cutouts, including three for blade attachments, one for an output shaft, and one for a spinner. The combined weight of the hub plus the interfaced components, including pitch-drive mechanisms, can approach 100,000 pounds. Structural inefficiency equates to excessive weight, and for structures such as wind turbines that are mounted on supporting towers, these supporting towers must be designed with capacity to support the excess weight.

BRIEF DESCRIPTION OF THE INVENTION

In one aspect, the present invention therefore provides a structure for a hub of a rotor. The structure includes a space frame having truss members configured to carry primary torsion, bending, and direct loading. The structure also includes a shell on the space frame configured to stabilize the space frame and carry shear loading.

In another aspect, the present invention provides a wind turbine for mounting on a tower. The wind turbine includes a generator, a shaft operatively coupled to the generator, a hub on the shaft, and one or more blades on the hub. The hub has a space frame having truss members configured to carry primary torsion, bending, and direct loading, and a shell on the space frame configured to stabilize the space frame and carry shear loading.

It will be appreciated that various configurations of the present invention reduce weight at the top of a wind turbine tower by utilizing a more structurally efficient hub geometry that does not compromise reliability. In addition, some configurations of the present invention reduce hub manufacturing expense by eliminating wasteful processing and manufacturing costs and the amount of raw material required for manufacture of the hub.

DETAILED DESCRIPTION OF THE INVENTION

Some configurations of the present invention provide a stiffened shell structure for improved efficiency (i.e., increased load carrying capacity per unit weight). Also, some configurations of the present invention provide a space frame configured to carry primary torsion, bending and direct loading in a truss-like manner. Also provided in some configurations is a light-weight shell configured to act as shear wall to stabilize the frame and to carry shear loading. Formed truss members in some configurations "frame" cut-outs and provide stiffer cutouts. In addition, the frame eliminates stress concentrations because the primary loading is carried by the formed frame as direct tension/compression loads rather than as membrane loading in known monolithic shells.

Forming a space frame configuration of the present invention requires less material than forming a monolithic shell. Thin shell skins in some configurations can comprise metal or a composite material. Metal shell skins are welded or bolted in place in some configurations. Composite shell skins are bolted and/or bonded in place for redundancy in some configurations of the present invention.

Figure 1:
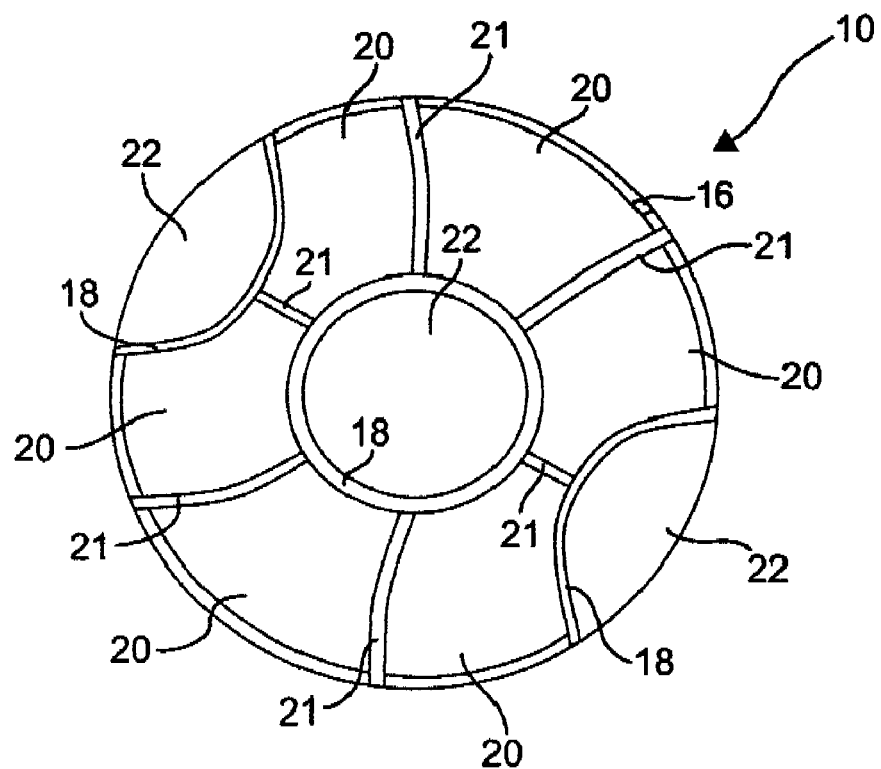
FIG. 1 is a head-on pictorial view of one configuration of the present invention.
Figure 2:
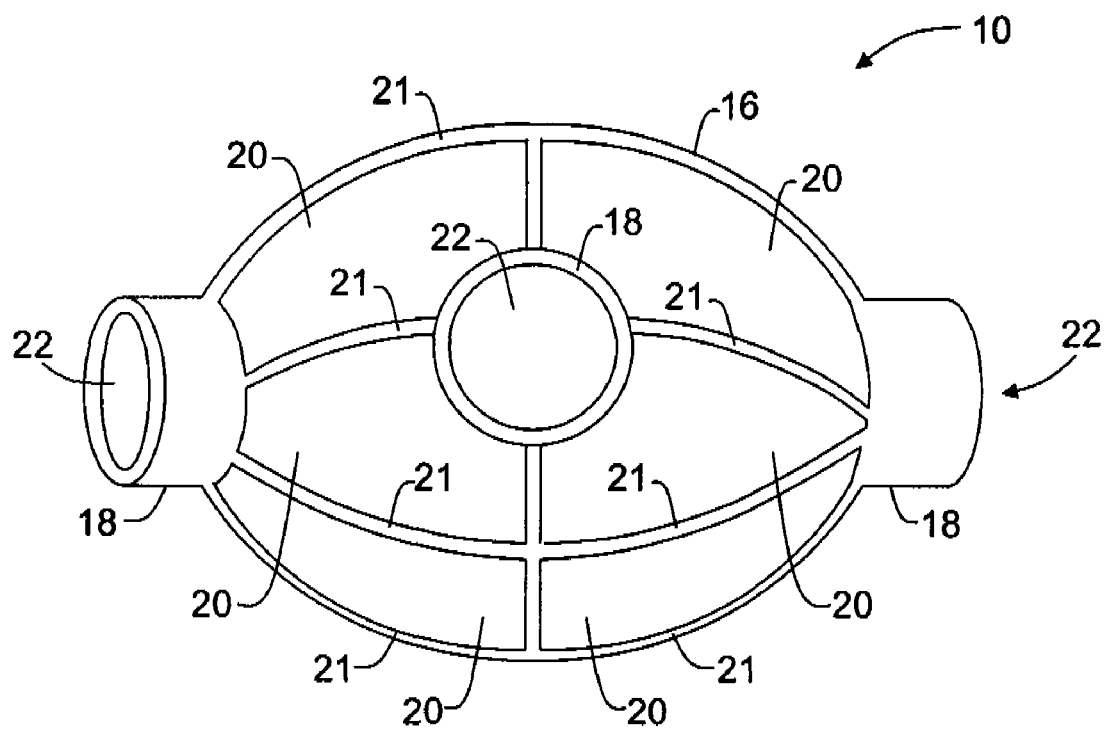
FIG. 2 is a side pictorial view of the configuration of FIG. 1.
Figure 3:
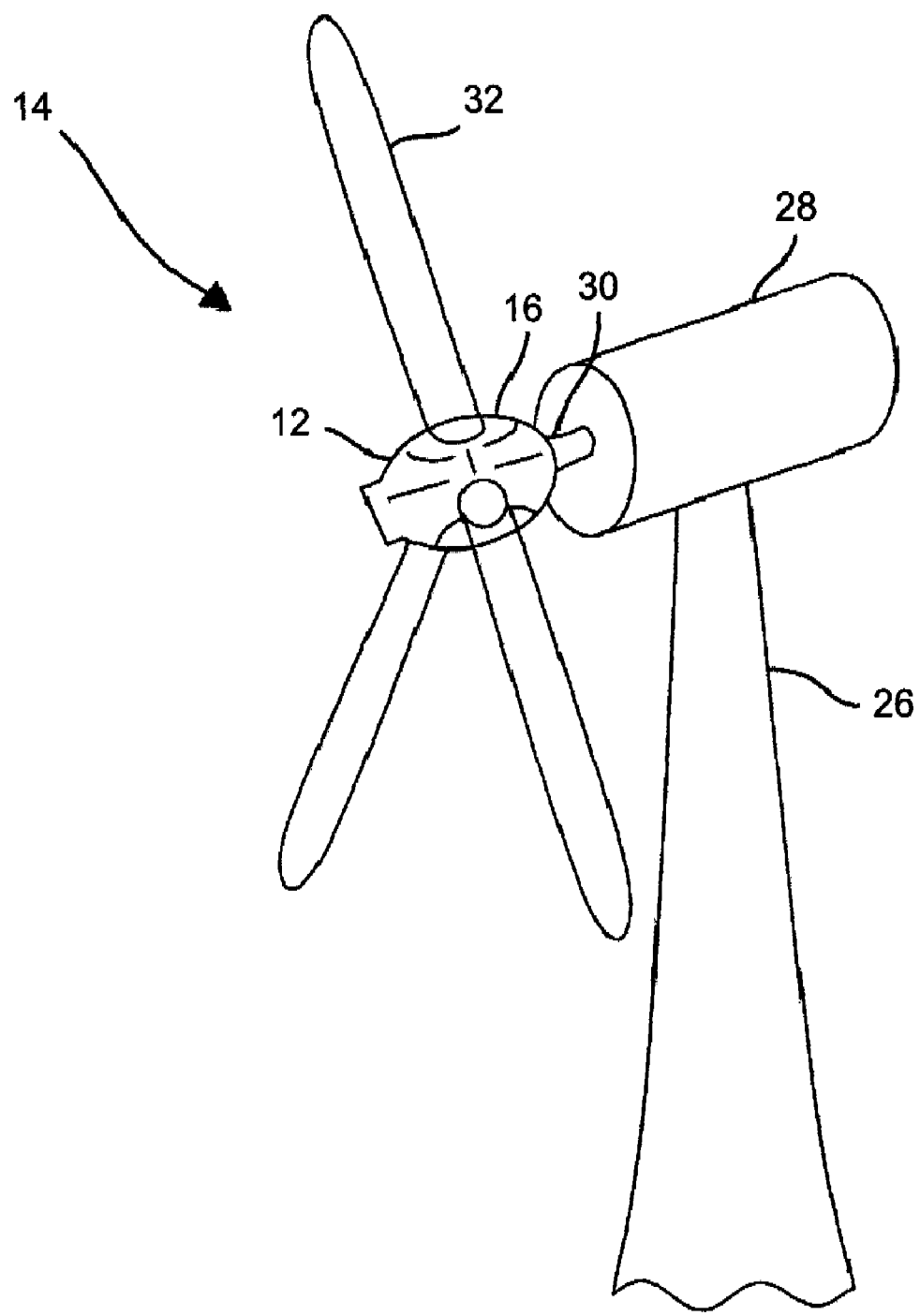
FIG. 3 is a view of a configuration of a wind turbine utilizing the hub configuration shown in FIGS. 1 and 2.

Thus, in some configurations of the present invention and referring to FIGS. 1, 2, and 3, a structure 10 for a hub 12 of a rotor 14 is provided. Structure 10 includes a space frame 16 having truss members 18 configured to carry primary torsion, bending, and direct loading and a meridional stiffened shell 20 on space frame 16 configured to stabilize space frame 16 and carry shear loading. Also in some configurations, truss members 18 are formed to frame cut-outs 22. Shell 20 can comprise a relatively thin metal shell 20. In configurations in which shell 20 is metal, suitable methods for attachment include, but are not limited to, welding and bolting, and combinations thereof. In some configurations, shell 20 comprises a relatively thin composite shell 20. In configurations in which shell 20 is a composite material, suitable methods for attachment include, but are not limited to, bolting and bonding (e.g., adhesive bonding), and combinations thereof.

In use, space frame 16 carries the primary loading like a truss. Shell 20 provides a shear tie and stabilizes the frame. In some configurations, five cut-outs 22 are provided and are carried by truss loading. For example, three of cut-outs 22 can be used for blades. Meridional stiffeners 21 are provided in the illustrated configuration. A load path is thus provided into a space frame in a manner reminiscent of a bridge truss. As a result, the thickness of shell 20 can be greatly reduced. The entire structure 10 can be internally cast.

Figure 4:
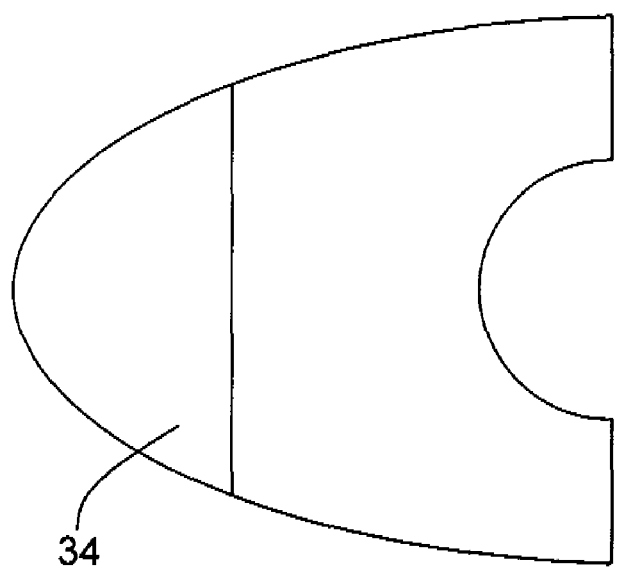
FIG. 4 is a side pictorial view of a spinner configuration suitable for the hub configuration shown in FIG. 1.
Figure 5:
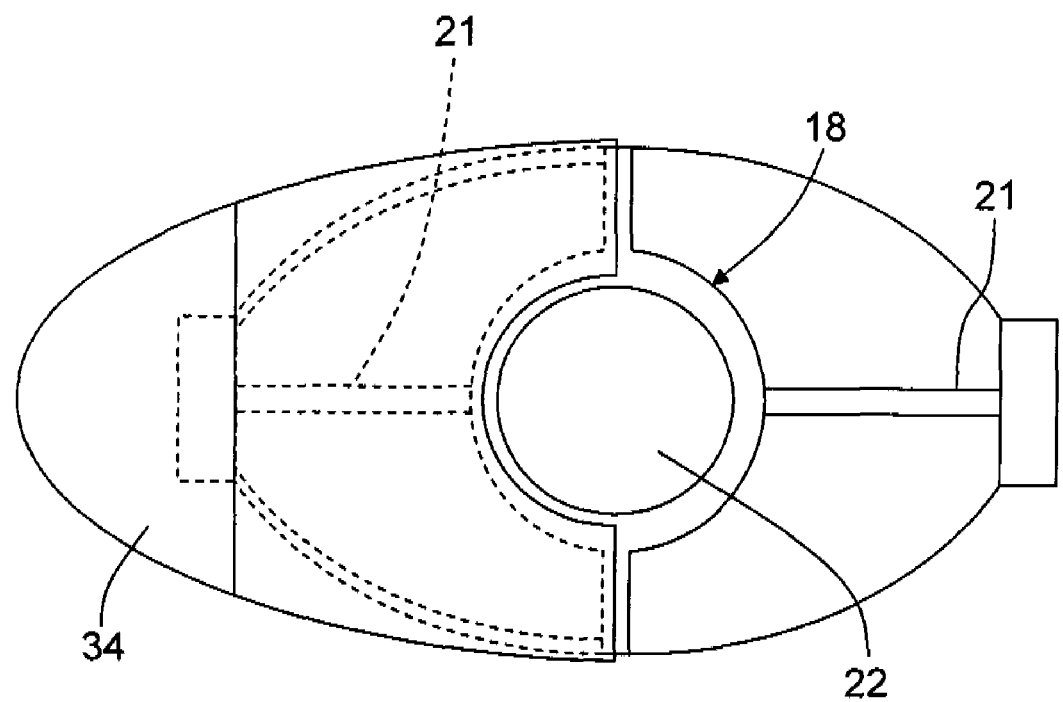
FIG. 5 is a side pictorial view of the spinner of FIG. 4 fitted onto the hub of FIG. 1, with dashed lines indicating a portion of the hub frame inside the spinner.

In some configurations, structure 10 is a part of a wind turbine 14 that is configured for mounting on a tower 26. More particularly, wind turbine 14, in some configurations of the present invention, includes a generator (not shown) inside a nacelle 28 that resides at the top of, or on a tower 26. A shaft 30 is operatively coupled to the generator to turn the generator to generate electricity. Hub 12 is mounted on shaft 30, and one or more (for example, three) blades 32 are mounted on hub 12. Hub 12 comprises a space frame 16 having truss members 18 configured to carry primary torsion, bending, and direct loading, and a meridional stiffened shell 20 on space frame 16 configured to stabilize space frame 16 and carry shear loading. As indicated above, truss members 18 are formed to frame cut-outs 22. Cut-outs 22 are used for blade attachments 32, an output shaft 30, and a spinner 34, shown in FIGS. 4 and 5. Spinner 34 is bolted to hub 12. Shell 20 comprises a relatively thin metal, and is either welded in place, bolted in place, or both, in some configurations. In some other configurations, shell 20 comprises a composite material, and is either bolted in place, bonded in place, or both.

It will thus be appreciated that configurations of the present invention provide a structurally efficient hub that reduces weight at the top of a wind turbine without compromising reliability. In addition, hub manufacturing expense is reduced in many configurations of the present invention by eliminating wasteful processing and manufacturing costs and the amount of raw material required for manufacture of the hub.

While the invention has been described in terms of various specific embodiments, those skilled in the art will recognize that the invention can be practiced with modification within the spirit and scope of the claims.

What is claimed is:

1. A structure for a hub of a rotor, said structure comprising:
    a space frame having truss members configured to carry primary torsion, bending, and direct loading, the truss members further configured to frame a first cut-out configured for a first blade, frame a second cut-out configured for a second blade, frame a third cut-out configured for a shaft, and frame a fourth cut-out configured for a spinner coupled to the hub; and
    a meridional stiffened thin shell on the space frame configured to stabilize the space frame and carry shear loading.

2. A structure in accordance with claim 1 wherein the truss members are formed to frame cut-outs.

3. A structure in accordance with claim 1 wherein the shell comprises a thin metal shell.

4. A structure in accordance with claim 3 wherein the shell is welded in place.

5. A structure in accordance with claim 3 wherein the shell is bolted in place.

6. A structure in accordance with claim 1 wherein the shell comprises a thin composite shell.

7. A structure in accordance with claim 6 wherein the shell is bolted in place.

8. A structure in accordance with claim 6 wherein the structure is bonded in place.

9. A structure in accordance with claim 6 wherein the shell is both bolted and bonded in place.

10. A wind turbine for mounting on a tower, said wind turbine comprising:
    a generator;
    a shaft operatively coupled to said generator;
    a hub coupled to the shaft,
    wherein the hub further comprises a space frame having truss members configured to carry primary torsion, bending, and direct loading, the truss members further configured to frame a first cut-out configured for a first blade, frame a second cut-out configured for a second blade, frame a third cut-out configured for a shaft, and frame a fourth cut-out configured for a spinner coupled to the hub; and
    a meridional stiffened thin shell on the space frame configured to stabilize the space frame and carry shear loading.

11. A wind turbine in accordance with claim 10 wherein the truss members are formed to frame five cut-outs.

12. A wind turbine in accordance with claim 10 wherein the shell comprises a thin metal shell.

13. A wind turbine in accordance with claim 12 wherein the shell is welded in place.

14. A wind turbine in accordance with claim 12 wherein the shell is bolted in place.

15. A wind turbine in accordance with claim 10 wherein the shell comprises a thin composite shell.

16. A wind turbine in accordance with claim 15 wherein the shell is bolted in place.

17. A wind turbine in accordance with claim 15 wherein the structure is bonded in place.

18. A wind turbine in accordance with claim 15 wherein the shell is both bolted and bonded in place.

* * * * *